United States Patent
Su et al.

(10) Patent No.: US 9,872,190 B2
(45) Date of Patent: Jan. 16, 2018

(54) METHOD FOR REPORTING CHANNEL QUALITY INFORMATION AND DEVICE THEREOF

(75) Inventors: Xin Su, Beijing (CN); Qiubin Gao, Beijing (CN); Rakesh Tamrakar, Beijing (CN); Zukang Shen, Beijing (CN); Shaohui Sun, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 0 days.

(21) Appl. No.: 14/002,113

(22) PCT Filed: Nov. 8, 2011

(86) PCT No.: PCT/CN2011/081922
§ 371 (c)(1),
(2), (4) Date: Aug. 28, 2013

(87) PCT Pub. No.: WO2012/062197
PCT Pub. Date: May 18, 2012

(65) Prior Publication Data
US 2014/0029463 A1 Jan. 30, 2014

(30) Foreign Application Priority Data
Nov. 8, 2010 (CN) .......................... 2010 1 0539036

(51) Int. Cl.
*H04W 24/10* (2009.01)
*H04L 1/06* (2006.01)
(Continued)

(52) U.S. Cl.
CPC .......... *H04W 24/10* (2013.01); *H04B 7/0689* (2013.01); *H04L 1/003* (2013.01);
(Continued)

(58) Field of Classification Search
None
See application file for complete search history.

(56) References Cited

U.S. PATENT DOCUMENTS

| 5,099,447 A | 3/1992 | Myszewski |
| 2009/0262854 A1* | 10/2009 | Lee et al. ............... 375/267 |
| 2014/0016496 A1* | 1/2014 | Su et al. ............... 370/252 |

FOREIGN PATENT DOCUMENTS

| CN | 101154975 A | 4/2008 |
| CN | 101674655 A | 3/2010 |

(Continued)

OTHER PUBLICATIONS

International Search Report for PCT/CN2011/081922, dated Feb. 23, 2012.

(Continued)

*Primary Examiner* — Kouroush Mohebbi
(74) *Attorney, Agent, or Firm* — Oliff PLC

(57) ABSTRACT

Disclosed are a method for reporting channel quality information and a device thereof, the method comprising: according to configuration information of a CSI-RS, a user equipment measuring the CSI-RS to acquire a downlink channel transmission matrix; according to a PDSCH transmission scheme used as a basis when determining a Channel Quality Indicator (CQI), and according to the measured downlink channel transmission matrix, the user equipment determining the CQI of a frequency domain reporting unit; and the user equipment reporting the determined CQI to a network side. Through the present invention, the measurement and reporting of the channel quality information based on the CSI-RS is implemented based on transmission of non-PMI feedback.

8 Claims, 1 Drawing Sheet

(51) Int. Cl.
  *H04L 5/00*   (2006.01)
  *H04L 1/00*   (2006.01)
  *H04B 7/06*   (2006.01)
(52) U.S. Cl.
  CPC .............. *H04L 1/0026* (2013.01); *H04L 1/06* (2013.01); *H04B 7/0671* (2013.01); *H04B 7/0697* (2013.01); *H04L 1/0003* (2013.01); *H04L 1/0009* (2013.01); *H04L 5/0023* (2013.01); *H04L 5/0048* (2013.01); *H04L 5/0094* (2013.01)

(56) References Cited

FOREIGN PATENT DOCUMENTS

| | | |
|---|---|---|
| CN | 101841356 A | 9/2010 |
| CN | 101841828 A | 9/2010 |
| CN | 102045762 A | 5/2011 |
| WO | 2010/106729 A1 | 9/2010 |
| WO | WO 2011040751 A2 * | 4/2011 |

OTHER PUBLICATIONS

International Preliminary Report on Patentability and Written Opinion of the International Searching Authority for PCT/CN2011/081922, dated Feb. 23, 2012.

"Matrix Multiplication," Wikipedia, http://en.wikipedia.org/wiki/Matrix_multiplication, last updated Jan. 16, 2015 at 08:20, 18 pages.

* cited by examiner

METHOD FOR REPORTING CHANNEL QUALITY INFORMATION AND DEVICE THEREOF

CROSS REFERENCE TO RELATED APPLICATIONS

This application is the National Stage of PCT/CN2011/081922, filed on 8 Nov. 2011 which claims priority under 35 U.S.C. §119 of CN 201010539036.9 filed on 8 Nov. 2010, the disclosure of which is incorporated by reference. The international application under PCT article 21(2) was not published in English.

The application requires the priority to Chinese patent application, which should be submitted to the Chinese Patent Office on Nov. 8, 2010, the application No. 201010539036.9, invention name as "Method for Reporting Channel Quality Information and Device thereof".

FIELD OF THE PRESENT INVENTION

The present invention relates to wireless communication field, in particular to method for reporting channel quality information and device thereof.

BACKGROUND OF THE PRESENT INVENTION

The Long Term Evolution (LTE) system adopts the physical layer frame on the basis of Orthogonal Frequency Division Multiplexing (OFDM) and Multiple-Input Multiple-Out-put (MIMO) technologies. In order to adapt to transmission environment better, the LTE system adopts various kinds of adaptive technologies. Based on different application scenes, 8 kinds of downlink transmission modes are defined in the LTE Rel-8/9 system, while another new kind of transmission mode needs to be defined in the Rel-10 system to support top 8 layers' downlink MIMO transmission. Based on the adapting foundation of transmission mode, the evolved Node B (eNB) in Transmission Mode (TM) 4, 7, 8 and 9 is able to select downlink transmission rank adaptively according to spatial characteristics of channels. Theoretically speaking, the network side is able to adjust data rate of each data layer through controlling modulation order and code rate, so as to match transmission capability of each spatial data channel precisely. However, considering control complexity and feedback overhead, the MIMO transmission of LTE system can support dynamic adjustment of at most 2-codeword Modulation & Coding Scheme (MCS). Within the transmission bandwidth of the LTE system, channel response often shows obvious frequency selectivity, thus the eNB can select User Equipment (UE) and schedule flexibly according to the channel state and interference condition at each frequency band of each UE, so as to acquire frequency selective scheduling and multi-user diversity gain. In the mean time, the network side can allocate resources reasonably according to channel state at each frequency band to avoid interference among cells.

Channel quality information is the important foundation of all kinds of adaptive adjustments and scheduling performed by the network side. The LTE system quantizes channel quality into 4-bit Channel Quality Indicator (CQI), label of each CQI corresponds to an assembly of modulation mode and code rate, under which the UE should guarantee the error probability of receiving transmission block to be within 0.1.

When calculating CQI, the UE needs to assume the transmission scheme of the Physical Downlink Shared Channel (PDSCH) according to its transmission mode. For example, when calculating the CQI defined in the LTE Rel-9 system, assumption mode of the PDSCH transmission scheme is shown in Table 1.

TABLE 1

Assumption of PDSCH Transmission Scheme When Calculating the CQI

| Transmission mode | Transmission scheme of PDSCH | Description |
|---|---|---|
| 1 | Single-antenna port, port 0 | Single-antenna port, port 0 |
| 2 | Transmit diversity | Transmit diversity |
| 3 | Transmit diversity if the associated rank indicator is 1, otherwise large delay CDD | Transmit diversity if the associated rank indicator is 1, otherwise large delay Cyclic Delay Diversity (CDD) |
| 4 | Closed-loop spatial multiplexing | Closed-loop spatial multiplexing |
| 5 | Multi-user MIMO | Multi-user MIMO |
| 6 | Closed-loop spatial multiplexing with a single transmission layer | Closed-loop spatial multiplexing with a single transmission layer |
| 7 | If the number of PBCH antenna ports is one, Single-antenna port, port 0; otherwise Transmit diversity | If the number of PBCH antenna ports is 1, single-antenna port, port 0; otherwise transmit diversity |
| 8 | If the UE is configured without PMI/RI reporting: if the number of PBCH antenna ports is one, single-antenna port, port 0; otherwise transmit diversity If the UE is configured with PMI/RI reporting: closed-loop spatial multiplexing | If the UE is configured without PMI/RI reporting: if the number of PBCH antenna ports is 1, single-antenna port, port 0; otherwise transmit diversity If the UE is configured with PMI/RI reporting: closed-loop spatial multiplexing |

The Cell-specific Reference Signal (CRS)-based measurement and demodulation mode are adopted in the transmission modes 1~6 of the LTE Rel-8/9 system, while the CRS-based measurement and the Demodulation Reference Signal (DMRS)-based demodulation mechanism are adopted in TM 7 and TM 8; wherein, in TM 2~6, the UE needs to calculate and report the recommended Precoding Matrix Indicator (PMI) according to measurement of the CRS; when reporting CQI, the UE assumes that the eNB uses the reported PMI. Non-codebook precoding mode is adopted in TM 7, the UE only needs to report the CQI to the eNB, then the eNB will calculate precoding or figurative vector. Both the PMI and non-PMI feedback modes are supported in the TM 9 system. Based on feedback mode of high-layer configuration and specific reporting mode, the UE can generate reporting content (including PMI/Rank Indication (RI)/CQI) according to the measurement of CRS. In the LTE Advanced (LTE-A) system, in order to support higher-order MIMO transmission (maximum supporting 8 data layers) and multi-cell combined treatment function in subsequent versions, a newly defined Channel State Information-Reference Signal (CSI-RS) is introduced. The UE working in TM 9 cannot generate CQI/PMI/RI reporting information without the measurement of CSI-RS.

In the procedure of realizing the present invention, at least the following problems exist in the current technologies:

In TM 9, for the transmission mode based PMI feedback, the UE can assume that the eNB uses the reported PMI/RI. On this basis, the UE can calculate the CQI of each codeword as per mode similar to closed-loop spatial multiplexing (such as TM 4 system). However, with regard to non-PMI feedback-based transmission mode, no CSI-RS based measurement or reporting method for channel quality information exists currently.

SUMMARY OF THE PRESENT INVENTION

The embodiments of the present invention aim to provide method for reporting channel quality information and device thereof, so as to implement CSI-RS-based measuring and reporting for channel quality information on the basis of non-PMI feedback transmissions, for this purpose, the embodiments of the present invention adopt the following technical scheme:

A method for reporting channel quality information, which comprising: measuring, by a User Equipment (UE), Channel-State Information-Reference Signal (CSI-RS) according to configuration information of the CSI-RS, to acquire a downlink channel transmission matrix;

determining, by the UE, Channel Quality Indicator (CQI) of a frequency domain reporting unit according to transmission scheme of Physical Downlink Shared Channel (PDSCH) used when determining the CQI, and the downlink channel transmission matrix acquired by measurement, wherein, the transmission scheme of PDSCH includes: assume that base station maps data of the PDSCH to P (number) CSI-RS ports as per a rule of $$\begin{bmatrix} y^{(0)} \\ \vdots \\ y^{(P-1)} \end{bmatrix} = W \cdot s;$$

wherein, W represents a P×1 dimension matrix and is known to the UE and network side before reporting CQI;

reporting, by the UE, the determined CQI to the network side.

A UE, which comprises:

a measurement module, used to measure CSI-RS according to the configuration information of the CSI-RS, to acquire a downlink channel transmission matrix;

a determination module, used to determine CQI of a frequency domain reporting unit according to the downlink channel transmission matrix acquired by measurement of the measurement module, and the transmission scheme of PDSCH used when determining the CQI; reporting module, used to report the CQI determined by the determination module to network side;

memory module, used to save the transmission scheme information of PDSCH, the transmission scheme of PDSCH includes: assume that base station maps data of the PDSCH to P (number) CSI-RS ports as per a rule of $$\begin{bmatrix} y^{(0)} \\ \vdots \\ y^{(P-1)} \end{bmatrix} = W \cdot s;$$

wherein, W represents a P×1 dimension matrix and is known to the UE and the network side before reporting CQI.

In the embodiments of the present invention mentioned above, the UE measures the CSI-RS, to acquire a downlink channel transmission matrix, determines and reports the CQI of a frequency domain unit according to the downlink channel transmission matrix as well as the transmission scheme of the PDSCH used when determining the CQI, implements measurement and reporting of CSI-RS based channel quality information on the basis of non-PMI feedback transmission.

DETAILED DESCRIPTION OF THE EMBODIMENTS OF THE PRESENT INVENTION

For the above existing problems of the current technology, the embodiments of the present invention put forward a non-PMI feedback mode-based mechanism for reporting channel quality information.

In the following parts, detailed descriptions of embodiments of the present invention are made combined with drawings of the embodiments.

Figure 1:
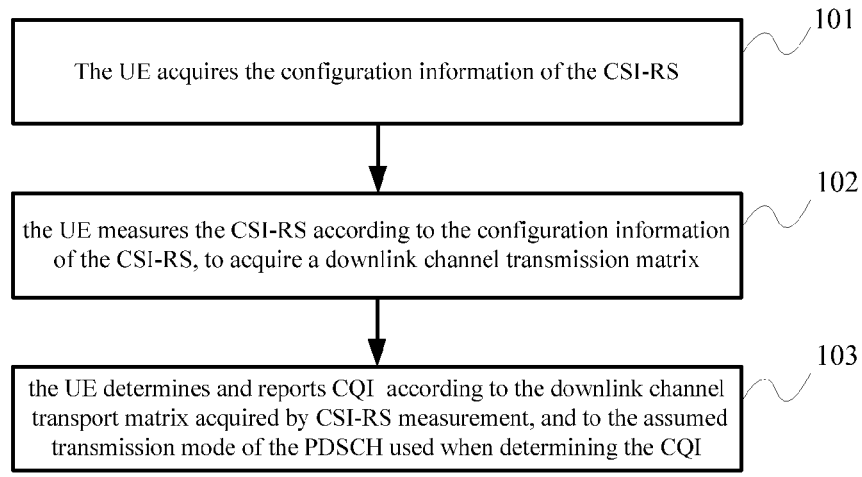
FIG. 1 is a flow diagram of reporting channel quality information of embodiments of the present invention.

FIG. 1 is referred to as the flow diagram of reporting channel quality information of embodiments of the present invention; which comprises:

Step 101, the UE acquires configuration information of CSI-RS.

To be specific, the UE can acquire the configuration information of the CSI-RS according to system broadcast mode, viz. the UE can monitor the broadcast information of the network side and acquire the carried configuration information of the CSI-RS. The CSI-RS configuration information includes time-frequency position of the CSI-RS, transmission cycle, the number of ports for transmission of CSI-RS, etc.

Step 102, the UE measures the CSI-RS according to the configuration information of the CSI-RS, to acquire a downlink channel transmission matrix.

Wherein, according to the transmission cycle of the CSI-RS, the UE can measure the CSI-RS transmitted from the time-frequency position indicated by the configuration information of the CSI-RS. The UE can acquire a downlink channel transmission matrix by measurement of the CSI-RS, and the channel transmission matrix could be shown as follows:

$$H = \begin{bmatrix} h_{11} & \cdots & h_{1T} \\ \vdots & \ddots & \vdots \\ h_{R1} & \cdots & h_{RT} \end{bmatrix} \quad [1]$$

The UE can further measure the received interference and noise.

Step 103, the UE determines and reports CQI to the network side according to the downlink channel transmission matrix acquired by measurement of the CSI-RS.

Wherein, before reporting CQI, the UE has acquired the downlink channel transmission scheme used when calculating the CQI. To be specific, the downlink channel transmission scheme used when calculating the CQI could be pre-configured to the UE and base station, so that the UE and the eNB will know the downlink channel transmission scheme used when calculating the CQI before UE reporting CQI. Based on the reporting mode configured by the high-layer, the UE can calculate and report the CQI for each frequency domain reporting unit (such as broadband or sub-band) according to the downlink channel transmission scheme used when calculating the CQI.

Wherein, reporting mode configured by the high-layer includes one of the following:

Physical Uplink Control Channel (PUCCH) reporting mode 1-0;

PUCCH reporting mode 2-0;

Physical Uplink Shared Channel (PUSCH) reporting mode 2-0;

PUSCH reporting mode 3-0.

In the embodiments of the present invention, the downlink channel transmission scheme used when calculating the CQI includes:

The UE assumes that the base station maps the data of the PDSCH to P (number) CSI-RS ports as per the rule of $$\begin{bmatrix} y^{(0)} \\ \vdots \\ y^{(P-1)} \end{bmatrix} = W \cdot s.$$

The value of the P could be 1, 2, 4, 8, etc. and it is equal to the number of CSI-RS ports included in the configuration information of the CSI-RS acquired by the UE.

Wherein, the P×1 dimension matrix w is a certain fixed matrix, or selected from a matrix set as per a preset sequence, so as to assure the eNB can get the w assumed by the UE when reporting the CQI every time. Wherein, specific definition or calculation or selection rule of Matrix w could be determined according to realization requirements or actual application.

It should be noted that, the UE can measure the CSI-RS and report the CQI according to the transmission cycle of the CSI-RS after acquiring the configuration information of the CSI-RS. As long as the configuration information of the CSI-RS remains unchanged, the UE can always measure the CSI-RS according to the configuration information. When the configuration information of the CSI-RS changes, the network side could inform the updated configuration information of the CSI-RS by broadcast mode, and the UE could then measure the CSI-RS and report the CQI after receiving the updated configuration information of the CSI-RS.

The UE could also acquire the configuration information of the CSI-RS in other ways besides the broadcast mode mentioned above.

Based on the same technical design, the embodiments of the present invention provide a UE which could be applied to the flow mentioned above.

Figure 2:
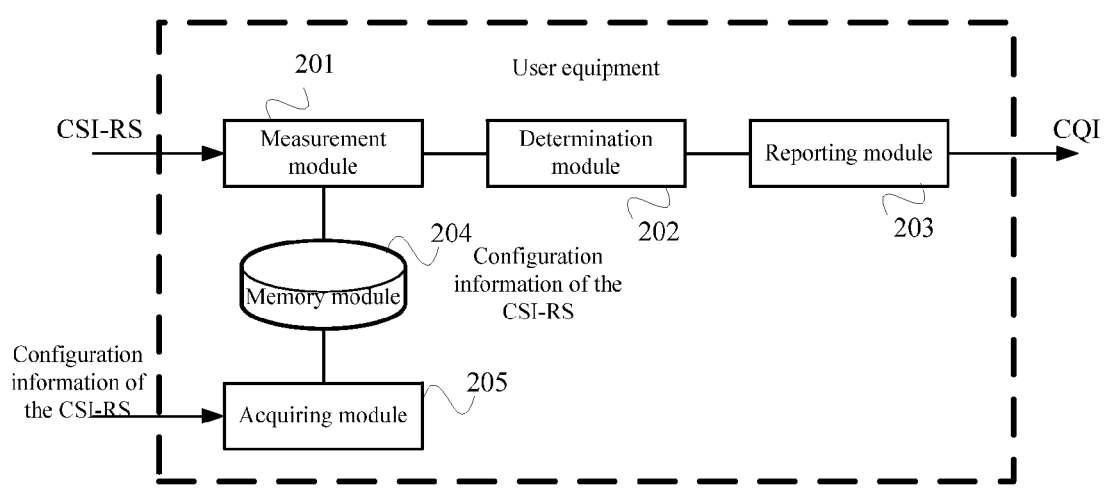
FIG. 2 is a structural diagram of UE of embodiments of the present invention.

As is shown in FIG. 2, the UE provided by embodiments of the present invention includes:

Measurement module 201, used to measure the CSI-RS according to the configuration information of the CSI-RS, to acquire a downlink channel transmission matrix;

Determination module 202, used to determine the CQI of a frequency domain reporting unit according to the downlink channel transmission matrix acquired by measurement of the measurement module, and the transmission scheme of the PDSCH used when determining the CQI;

Reporting module 203, used to report the CQI determined by the determination module 202 to the network side.

The UE could also include memory module 204, used to save the transmission scheme information of the PDSCH, the transmission scheme of the PDSCH includes:

Assume that the base station maps the data of the PDSCH to P (number) CSI-RS ports as per the rule of $$\begin{bmatrix} y^{(0)} \\ \vdots \\ y^{(P-1)} \end{bmatrix} = W \cdot s;$$

wherein, W represents a P×1 dimension matrix and is known to the UE and the network side before reporting CQI.

The mode of reporting the CQI by reporting module 203 of the EU is one of the following:

Physical uplink control channel (PUCCH) reporting mode 1-0;

PUCCH reporting mode 2-0;

Physical uplink shared channel (PUSCH) reporting mode 2-0;

PUSCH reporting mode 3-0.

The UE mentioned above could also include acquiring module 205, used to acquire the configuration information of the CSI-RS by broadcast mode, and save the configuration information of the CSI-RS into memory module 204.

Through the description of the embodiments of the present invention, the UE acquires a downlink channel transmission matrix by measuring the CSI-RS, determines and reports the CQI according to the downlink channel transmission matrix as well as the preconfigured transmission scheme of the PDSCH used when determining the CQI, realizes measurement and reporting of CSI-RS-based channel quality information on the basis of non-PMI feedback transmission. Wherein, the embodiments of the present invention assume the PDSCH is transmitted by Ws scheme, so as to enable a easy and simple CQI determination.

The technical personnel in this field can be understood that the modules can be distributed in device of the embodiments according to the description of the embodiments above, and also can be varied in one or multiply device of the embodiments. The modules of the embodiments can be combined into a module, and also can be further split into several sub-modules.

Through the description of the embodiments above, the technical personnel in this field can understand clearly that the present invention can be implemented by software and necessary general hardware platform or hardware (the former is the best in most cases). Based on this understanding, the technical scheme or the part making contributions to the prior art of the present invention can be embodied by a form of software products essentially which can be saved in a storage medium, including a number of instructions for making a computer device (such as personal computers, servers, or network equipments, etc.) implement the methods described in the embodiments of the present invention.

The descriptions above are only preferred embodiments, it should be pointed out, that for general technical personnel in this field, on the premise of not breaking away from principles of the present invention, some improvements and decorating can be done, which should be as the protection scope of the present invention.

The invention claimed is:

1. A method for reporting channel quality information, the method comprising:

acquiring, by a User Equipment (UE), configuration information of a Channel-State Information-Reference Signal (CSI-RS);

acquiring, by the UE, a downlink channel transmission matrix by measuring the CSI-RS according to the configuration information of the CSI-RS;

assuming, by the UE, a transmission scheme of a Physical Downlink Shared Channel (PDSCH) according to a transmission mode of the PDSCH;

when the transmission scheme is a first type of transmission scheme, calculating and reporting, by the UE, a Channel Quality Indicator (CQI) and a recommended Precoding Matrix Indicator (PMI); and when the transmission scheme is a second type of transmission scheme, calculating and reporting, by the UE, the CQI using a non-codebook precoding mode and non-PMI feedback transmission, respectively.

2. The method of claim 1, wherein the CSI-RS configuration information includes at least one of: a time-frequency position of the CSI-RS, a transmission cycle, and a number of ports for transmission of CSI-RS.

3. The method of claim 1, further comprising: acquiring, by the UE, the configuration information of the CSI-RS according to a system broadcast mode.

4. The method of claim 1, further comprising: measuring, by the UE, according to the transmission cycle of the CSI-RS, the CSI-RS transmitted from the time-frequency position indicated by the configuration information of the CSI-RS.

5. The method of claim 1, further comprising: measuring, by the UE, received interference and noise.

6. The method of claim 1, wherein the downlink channel transmission scheme used when calculating the CQI is preconfigured to the UE and base station, so that the UE and the eNB will know the downlink channel transmission scheme used when calculating the CQI before the UE reports the CQI.

7. The method of claim 1, wherein the UE measures the CSI-RS and reports the CQI according to the transmission cycle of the CSI-RS after acquiring the configuration information of the CSI-RS, when the configuration information of the CSI-RS changes, the network side informs the UE of updated configuration information of the CSI-RS by broadcast mode, and the UE then measures the CSI-RS and report the CQI after receiving the updated configuration information of the CSI-RS.

8. A user equipment (UE) comprising:

a network communication interface; and a processor configured to:

acquire configuration information of a Channel-State Information-Reference Signal (CSI-RS);

acquire a downlink channel transmission matrix by measuring the CSI-RS according to the configuration information of the CSI-RS;

assume a transmission scheme of a Physical Downlink Shared Channel (PDSCH) according to a transmission mode of the PDSCH;

when the transmission scheme is a first type of transmission scheme, calculate and report a Channel Quality Indicator (CQI) and a recommended Precoding Matrix Indicator (PMI); and when the transmission scheme is a second type of transmission scheme, calculate and report the CQI using a non-codebook precoding mode and non-PMI feedback transmission, respectively.

* * * * *